(12) United States Patent
Chen et al.

(10) Patent No.: US 12,086,085 B2
(45) Date of Patent: Sep. 10, 2024

(54) MOTOR DRIVER AND CONTROL METHOD THEREOF AND MOTOR DRIVING SYSTEM

(71) Applicant: ANPEC ELECTRONICS CORPORATION, Hsinchu (TW)

(72) Inventors: Li-Wei Chen, Hsinchu (TW); Chung-Hsien Fu, Hsinchu (TW); Kun-Min Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 428 days.

(21) Appl. No.: 17/528,239

(22) Filed: Nov. 17, 2021

(65) Prior Publication Data
US 2023/0058109 A1 Feb. 23, 2023

(30) Foreign Application Priority Data
Aug. 18, 2021 (TW) ................................. 110130410

(51) Int. Cl.
*H02P 6/16* (2016.01)
*G06F 13/32* (2006.01)
*H02P 6/18* (2016.01)

(52) U.S. Cl.
CPC .......... *G06F 13/32* (2013.01); *G06F 2213/40* (2013.01)

(58) Field of Classification Search
CPC .................................... H02P 21/12; H02P 6/18
See application file for complete search history.

(56) References Cited

U.S. PATENT DOCUMENTS

| 7,174,731 | B2 | 2/2007 | Okano | |
|---|---|---|---|---|
| 9,871,477 | B2* | 1/2018 | Tsai | H02P 6/06 |
| 2018/0195517 | A1* | 7/2018 | Lai | H02P 6/04 |
| 2021/0143827 | A1* | 5/2021 | Huynh | H03M 1/34 |

FOREIGN PATENT DOCUMENTS

TW 200308140 A 12/2003

* cited by examiner

*Primary Examiner* — Kawing Chan
*Assistant Examiner* — Charles S Laughlin
(74) *Attorney, Agent, or Firm* — Li & Cai Intellectual Property (USA) Office

(57) ABSTRACT

A motor driver, a control method of the motor driver, and a motor driving system are provided. The motor driver includes a rotation information pin, an analog detecting circuit and a mode switching circuit. The rotation information pin is configured to receive a reference signal. The analog detecting circuit and the mode switching circuit are respectively and electrically connected to the rotation information pin and the analog detecting circuit. The analog detecting circuit determines whether the reference signal is an analog signal, and the motor driver is maintained in a master mode when the reference signal does not belong to the analog signal. The mode switching circuit determines whether the reference signal is a noise when the reference signal is the analog signal. The mode switching circuit switches the motor driver from the master mode to a slave mode when the reference signal is not the noise.

10 Claims, 6 Drawing Sheets

MOTOR DRIVER AND CONTROL METHOD THEREOF AND MOTOR DRIVING SYSTEM

CROSS-REFERENCE TO RELATED PATENT APPLICATION

This application claims the benefit of priority to Taiwan Patent Application No. 110130410, filed on Aug. 18, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor driver, a control method of the motor driver and a motor driving system, and more particularly to a motor driver, a control method of the motor driver and a motor driving system that allow switching from a master mode to a slave mode or from the slave mode to the master mode.

BACKGROUND OF THE DISCLOSURE

Currently, as computers are developed to have higher specifications with respect to computing speed and storage capacity, simultaneously using multiple fans for heat dissipation is a common method of heat dissipation. In a conventional control method, a conventional motor master-slave system is used with a single controller, so as to effectively control a rotation status and a rotation speed of each fan.

In the conventional motor master-slave system, a master motor chip and a slave motor chip are usually assigned with different material numbers or are assigned the same material number, and the difference between the master motor chip and the slave motor chip can be defined by extra pins for external control. In addition, two or more communication pins are usually used between the master motor chip and the slave motor chip for communication purposes, so that real-time conditions of the main motor chip and the slave motor chip can be provided to each other, by which an appropriate rotation response can be made.

SUMMARY OF THE DISCLOSURE

In response to the above-referenced technical inadequacies, the present disclosure provides a motor driver, a control method of the motor driver, and a motor driving system.

In one aspect, the present disclosure provides a motor driver, and the motor driver includes a rotation information pin, an analog detecting circuit and a mode switching circuit. The rotation information pin is configured to receive a reference signal. The analog detecting circuit is electrically connected to the rotation information pin. The mode switching circuit is electrically connected to the analog detecting circuit. The analog detecting circuit is configured to determine whether the reference signal is an analog signal, and the motor driver is maintained in a master mode when the reference signal does not belong to the analog signal. The mode switch circuit is configured to determine whether the reference signal is a noise when the reference signal is the analog signal. The mode switching circuit switches the motor driver from the master mode to a slave mode when the reference signal does not belong to the noise.

In certain embodiments, the analog detecting circuit is an analog-to-digital converter.

In certain embodiments, the analog detecting circuit is a comparator.

In certain embodiments, the mode switching circuit includes a potential judging circuit, and the potential judging circuit is configured to determine whether a potential of the reference signal continues to remain unchanged. The reference signal does not belong to the noise when the potential of the reference signal continues to remain unchanged, and the reference signal is the noise when the potential of the reference signal does not continue to remain unchanged.

In another aspect, the present disclosure provides a control method of a motor driver. The control method of the motor driver includes: receiving a reference signal by a rotation information pin; determining, by an analog detecting circuit, whether the reference signal is an analog signal; maintaining the motor driver in a master mode when the reference signal does not belong to the analog signal; determining, by a mode switching circuit, whether the reference signal is a noise when the reference signal is the analog signal; and switching, by the mode switching circuit, the motor driver from the master mode to a slave mode when the reference signal does not belong to the noise.

In certain embodiments, the step of determining whether the reference signal is the noise by the mode switching circuit includes: determining whether a potential of the reference signal continues to remain unchanged by a potential judging circuit. The reference signal does not belong to the noise when the potential of the reference signal continues to remain unchanged, and the reference signal is the noise when the potential of the reference signal does not continue to remain unchanged.

In yet another aspect, the present disclosure provides a motor driving system, and the motor driving system includes a first motor driver and a second motor driver. The first motor driver includes a first control command pin, a first rotation information pin, a first analog detecting circuit, and a first mode switching circuit. The first control command pin is configured to receive a control command, the first rotation information pin outputs a rotation speed signal according to the control command, the first rotation information pin is electrically connected to the first analog detecting circuit, and the first mode switching circuit is electrically connected to the first analog detecting circuit. The second motor driver includes a second control command pin, a second rotation information pin, a second analog detecting circuit, and a second mode switching circuit. The second control command pin is electrically connected to the first rotation information pin, the second rotation information pin is configured to receive a reference signal, the second rotation information pin is electrically connected to the second analog detecting circuit, and the second mode switching circuit is electrically connected to the second analog detecting circuit. The second analog detecting circuit is configured to determine whether the reference signal is an analog signal, and the second motor driver is maintained in a master mode when the reference signal does not belong to the analog signal. The second mode switching circuit is configured to determine whether the reference signal is a noise when the reference signal is the analog signal, and the second motor driver is switched from the master mode to a slave mode when the reference signal does not belong to the noise.

In certain embodiments, the motor driving system further includes a first motor and a second motor. The first motor and the second motor are respectively and electrically connected to the first motor driver and the second motor driver. The first motor is locked when the control command received by the first control command pin is a rotation command and the first motor abnormally stopped.

In certain embodiments, the motor driving system further includes the first motor and the second motor. The first motor and the second motor are respectively and electrically connected to the first motor driver and the second motor driver. The first motor is rotated normally when the control command received by the first control command pin is a rotation command and the first motor is not abnormally stopped.

In certain embodiments, the motor driving system further includes the first motor and the second motor. The first motor and the second motor are respectively and electrically connected to the first motor driver and the second motor driver. A rotation speed of the first motor is increased when the first motor rotates normally and the second motor is abnormally stopped.

In certain embodiments, the motor driving system further includes the first motor and the second motor. The first motor and the second motor are respectively and electrically connected to the first motor driver and the second motor driver. A rotation speed of the second motor is increased when the first motor is abnormally stopped.

In certain embodiments, the motor driving system further includes the first motor and the second motor. The first motor and the second motor are respectively and electrically connected to the first motor driver and the second motor driver. The second motor is locked when the control command received by the first control command pin is a rotation command and the second motor is abnormally stopped.

Therefore, in the motor driver, the control method of the motor driver and the motor driving system provided by the present disclosure, a user only needs to provide the reference signal to the rotation information pin of the motor driver for setting a mode of the motor driver as the master mode or the slave mode. In this way, all the motor drivers can share the same material number, thereby achieving an effect of reducing costs. In addition, a single communication transmission line is used to connect all the motor drivers, so that the motor driver in the master mode communicates with multiple motor drivers in the slave mode in real time, and the motor drivers in the slave mode also communicate with each other in real time. Furthermore, when the motor matched with any one of the motor drivers is abnormally stopped, other motor drivers are made aware of the abnormal stoppage through the communication transmission line and increase the rotation speed of their matched motors, so as to achieve the purpose of speed compensation.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
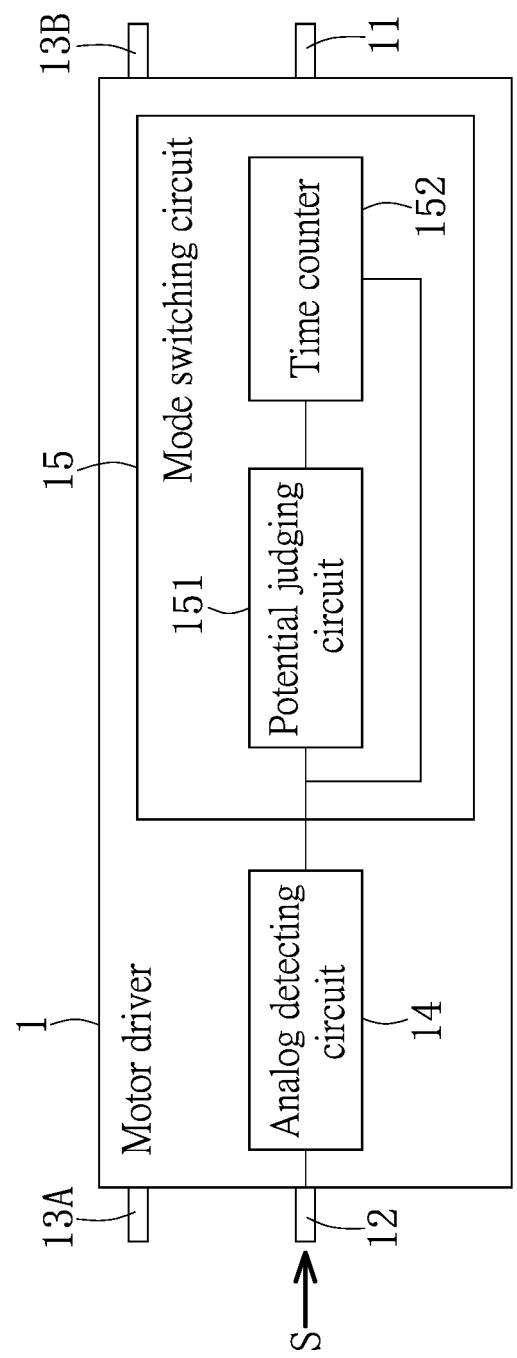
FIG. 1 is a functional block diagram of a motor driver according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

When pins of a motor driver are limited in terms of quantity, in order to quickly set a mode of the motor driver as a master mode or a slave mode, the present disclosure provides a motor driver and a control method thereof, and a motor driving system. A user only needs to externally send a reference signal to a rotation information pin of the motor driver, and an analog detecting circuit and a mode switching circuit can determine whether the reference signal is an analog voltage signal with a fixed potential. When the analog detecting circuit confirms that the reference signal is the analog voltage signal with the fixed potential, the motor driver is switched from the master mode to the slave mode. Conversely, when the analog detecting circuit confirms that the reference signal is not the analog voltage signal with the fixed potential, the motor driver remains in the master mode.

First Embodiment

FIG. 1 is a functional block diagram of a motor driver according to an embodiment of the present disclosure. Referring to FIG. 1, a motor driver 1 includes a control command pin 11, a rotation information pin 12, a first motor driving pin 13A, a second motor driving pin 13B, an analog detecting circuit 14 and a mode switching circuit 15. An initial mode of the motor driver 1 is set as a master mode, and the rotation information pin 12 is configured to receive a reference signal S. The first motor driving pin 13A and the second motor driving pin 13B are used for being connected with a motor. The analog detecting circuit 14 is electrically connected to the rotation information pin 12, and the mode switching circuit 15 is electrically connected to the analog detecting circuit 14. The analog detecting circuit 14 and the mode switching circuit 15 may include various configurations. For example, the analog detecting circuit 14 may be a comparator or an analog-to-digital converter, which is used to determine whether the reference signal S is an analog signal. The mode switching circuit 15 may include a potential judging circuit 151 and a time counter 152. The potential judging circuit 151 is electrically connected to the time counter 152 and the analog detecting circuit 14, and the time counter 152 is further electrically connected to the analog detecting circuit 14. When the analog detecting circuit 14 confirms that the reference signal S is the analog signal, the potential judging circuit 151 further determines whether a potential of the reference signal S continues to remain unchanged. If the potential judging circuit 151 confirms that the potential of the reference signal S continues to remain unchanged, the reference signal S is then confirmed to not be a noise, and the mode switching circuit 15 switches the motor driver 1 from the master mode to a slave mode.

Figure 2:
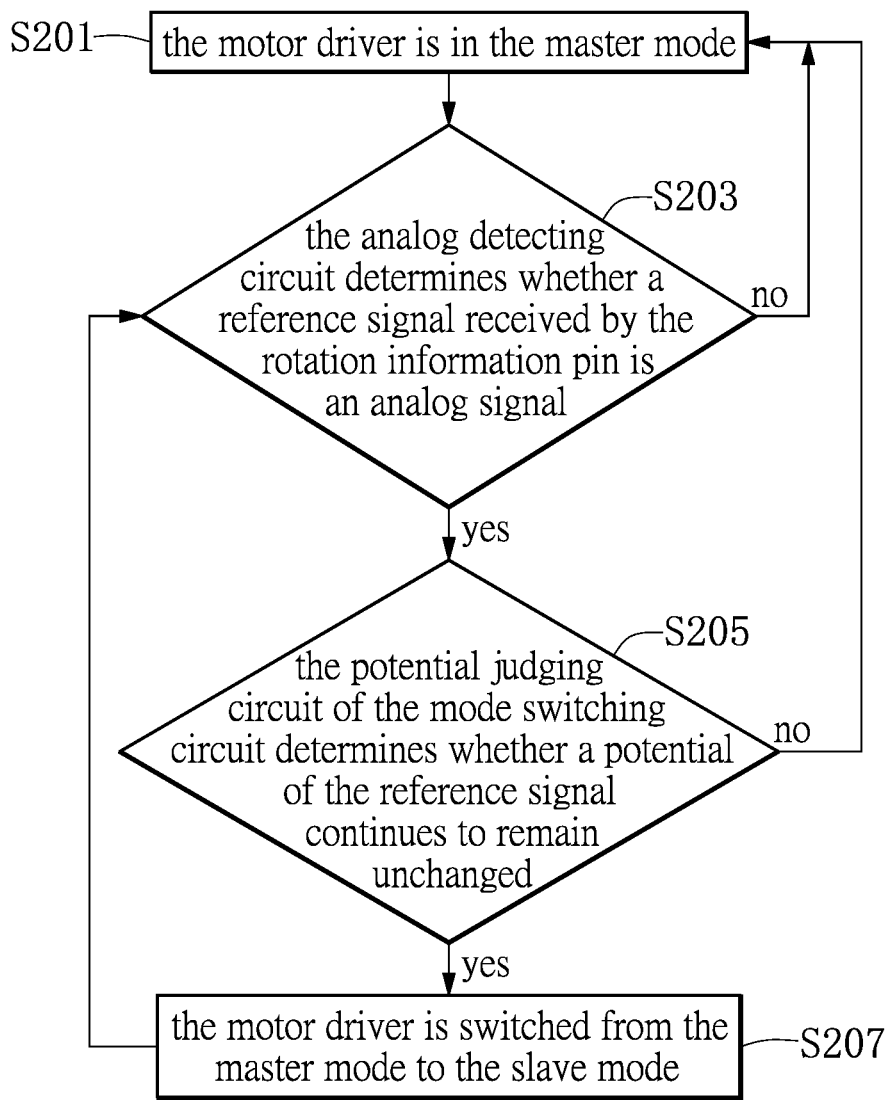
FIG. 2 is a flowchart of a control method of the motor driver according to one embodiment of the present disclosure.

FIG. 2 is a flowchart of a control method of the motor driver according to an embodiment of the present disclosure. Referring to FIG. 1 and FIG. 2, in a step S201, the motor driver 1 is in the master mode. In a step S203, the analog detecting circuit 14 determines whether the reference signal S received by the rotation information pin 12 is an analog signal. In detail, the rotating information pin 12 is used as an input pin of the motor driver 1 to receive the reference signal S, and the analog detecting circuit 14 determines whether the reference signal S is an analog signal. When the analog detecting circuit 14 confirms that the reference signal S is not the analog signal, the step S201 is then executed. When the analog detecting circuit 14 confirms that the reference signal S is the analog signal, then a step S205 is executed.

In the step S205, the potential judging circuit 151 of the mode switching circuit 15 determines whether a potential of the reference signal S continues to remain unchanged. When the potential judging circuit 15 confirms that the potential of the reference signal S continues to remain unchanged, the reference signal S is confirmed to not be a noise, and then a step S207 is executed. For example, the reference signal S is an analog voltage signal with a fixed potential (for example, 1.2 V), which indicates that the reference signal S is not a noise. In the step S207, the motor driver 1 is switched from the master mode to the slave mode. Then, the step S203 is executed. When the potential judging circuit 15 confirms that the potential of the reference signal S does not continue to remain unchanged, the reference signal S is confirmed to be a noise, and the step S201 is then executed.

Figure 3:
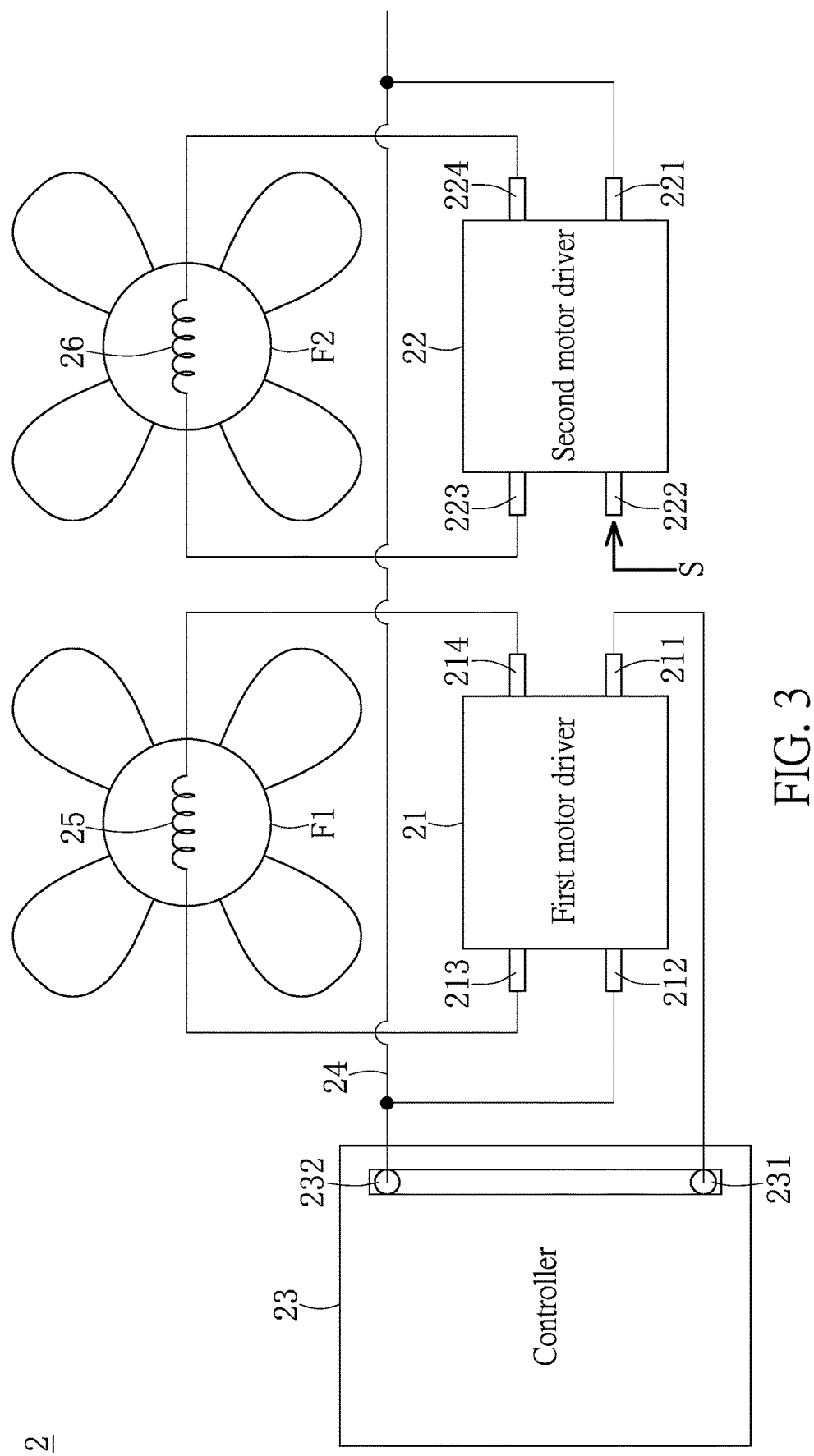
FIG. 3 is a schematic view of a motor driving system according to one embodiment of the present disclosure.

FIG. 3 is a schematic view of a motor driving system according to an embodiment of the present disclosure. Referring to FIG. 3, a motor driving system 2 includes a first motor driver 21, a second motor driver 22, a controller 23, a communication transmission line 24, a first motor 25 and a second motor 26. The first motor driver 21 includes a first control command pin 211, a first rotation information pin 212, a first motor driving pin 213, and a second motor driving pin 214. The first control command pin 211 is electrically connected to a first pin 231 of the controller 23, and the first rotation information pin 212 is electrically connected to a second pin 232 of the controller 23 through the communication transmission line 24. The first motor driving pin 213 and the second motor driving pin 214 are electrically connected to the first motor 25, and the first motor 25 is assembled to a first fan F1. The second motor driver 22 includes a second control command pin 221, a second rotation information pin 222, a third motor driving pin 223, and a fourth motor driving pin 224. The second control command pin 221 of the second motor driver 22 is electrically connected to the first rotation information pin 212 of the first motor driver 21 and the second pin 232 of the controller 23 through the communication transmission line 24. The second rotation information pin 222 is configured to receive the reference signal S, the third motor driving pin 223 and the fourth motor driving pin 224 are electrically connected to the second motor 26, and the second motor 26 is assembled to a second fan F2.

Figure 4A:
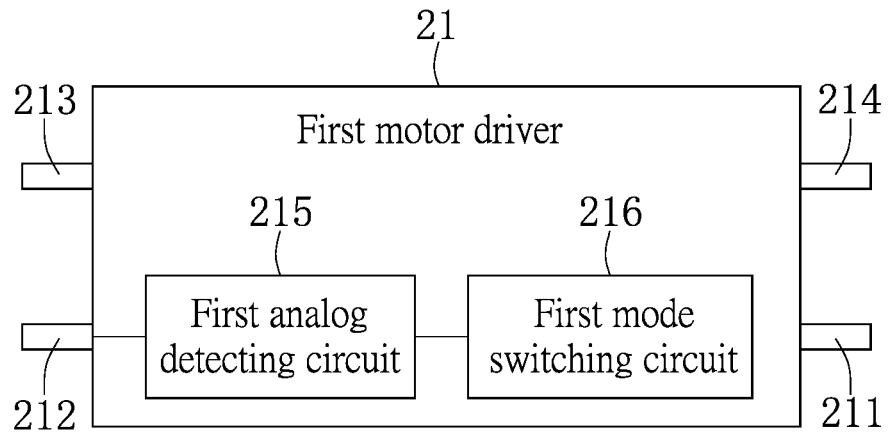
FIG. 4A is a functional block diagram of a first motor driver of FIG. 3.

FIG. 4A is a functional block diagram of a first motor driver of FIG. 3. Referring to FIG. 4A, the first motor driver 21 further includes a first analog detecting circuit 215 and a first mode switching circuit 216. The first analog detecting circuit 215 is electrically connected to the first rotation information pin 212, and the first mode switching circuit 216 is electrically connected to the first analog detecting circuit 215. The first analog detecting circuit 215 and the first mode switching circuit 216 may include various configurations. For example, circuit structures of the first analog detecting circuit 215 and the first mode switching circuit 216 are the same as circuit structures of the analog detecting circuit 14 and the mode switching circuit 15 as illustrated in FIG. 1, respectively.

Figure 4B:
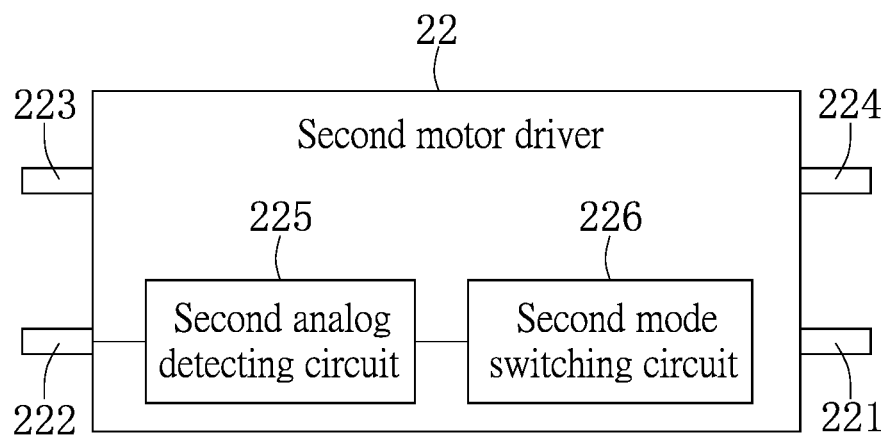
FIG. 4B is a functional block diagram of a second motor driver of FIG. 3.

FIG. 4B is a functional block diagram of a second motor driver of FIG. 3. In fact, a circuit structure of the second motor driver 22 is the same as that of the first motor driver 21. The second motor driver 22 further includes a second analog detecting circuit 225 and a second mode switching circuit 226. The second analog detecting circuit 225 is electrically connected to the second rotation information pin 222, and the second mode switching circuit 226 is electrically connected to the second analog detecting circuit 225. After the first control command pin 211 of the first motor driver 21 receives a rotation command from the controller 23, the first rotation information pin 212 of the first motor driver 21 outputs a rotational speed signal to the second pin 232 of the controller 23 and the second control command pin 221 of the second motor driver 22, and the first motor driver 21 drives the first motor 25 to rotate according to the rotation command. The second rotation information pin 222 of the second motor driver 22 is configured to receive the reference signal S, and the second analog detecting circuit 225 of the second motor driver 22 is configured to determine whether the reference signal S is an analog signal. When the second analog detecting circuit 225 of the second motor driver 22 confirms that the reference signal S is the analog signal, the second mode switching circuit 226 of the second motor driver 22 further determines whether the potential of the reference signal S continues to remain unchanged. When the second mode switching circuit 226 confirms that the potential of the reference signal S continues to remain unchanged (for example, the reference signal S is an analog voltage signal with a fixed potential, and is thus confirmed to not be a noise), the second motor driver 22 switches from the initial master mode to the slave mode. When the second motor driver 22 is switched to the slave mode, the first motor 25 and the second motor 26 rotate at the same rotation speed. Conversely, when the second analog detecting circuit 225 of the second motor driver 22 confirms that the potential of the reference signal S does not continue to remain unchanged (i.e., the reference signal S is a noise), the second motor driver 22 remains in the master mode.

A quantity of the motor drivers in the motor driving system 2 of the present disclosure is not limited to two, and may be more than two. An operating principle of the motor driving system 2 including more than two motor drivers is the same as that of the motor driving system 2 including two motor drivers. The control method of the motor driver in the master mode and the control method of the motor driver in the slave mode will be described later.

Figure 5:
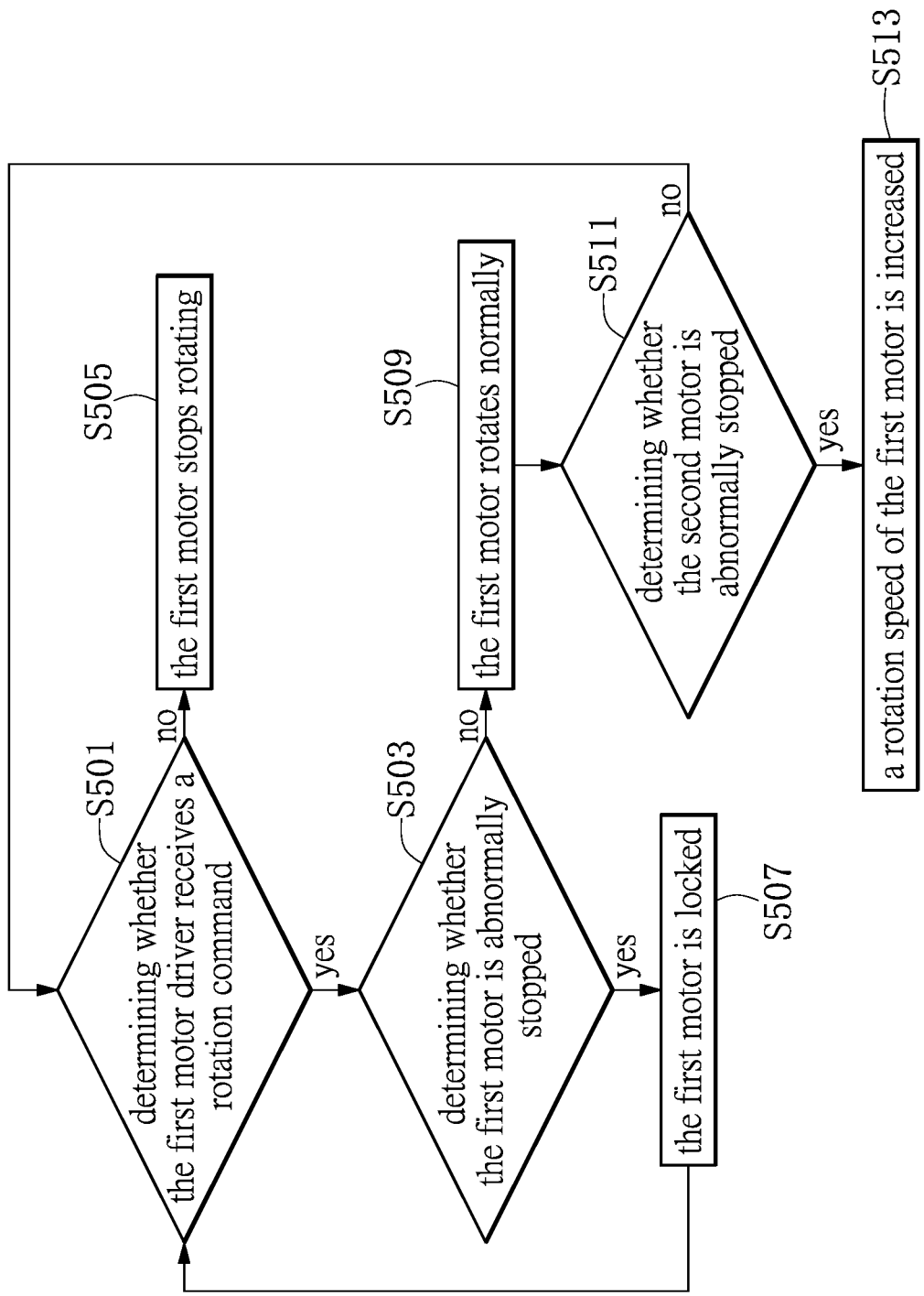
FIG. 5 is a flowchart of the control method of the motor driver in a master mode according to one embodiment of the present disclosure.

FIG. 5 is a flowchart of a control method of the motor driver in a master mode according to an embodiment of the present disclosure. Referring to FIG. 5, a step S501 is to determine whether the first motor driver 21 receives a rotation command. When the first motor driver 21 is confirmed to receive the rotation command, a step S503 is executed after the step S501. The step S503 is to determine whether the first motor 25 is abnormally stopped.

When the first motor driver 21 is confirmed to not receive the rotation command, a step S505 is executed after the step S501. In the step S505, the first motor 25 stops rotating. In detail, when the first motor 25 stops rotating, a voltage level of the first rotation information pin 212 of the first motor driver 21 and the second control command pin 221 of the second motor driver 22 are both pulled up to high voltage levels.

When the first motor 25 is confirmed to be abnormally stopped, a step S507 is executed after the step S503. For example, external forces or an excessive rise in temperature may cause the first motor 25 to be abnormally stopped. In the step S507, the first motor 25 is locked, and then the step S501 is executed.

When the first motor 25 is confirmed to be not abnormally stopped, a step S509 is executed after the step S503. In the step S509, the first motor 25 rotates normally. In detail, when the first motor 25 rotates normally, the voltage level of the first rotation information pin 212 of the first motor driver 21 is continuously switched between a high voltage level and a low voltage level over time.

After the step S509, a step S511 is executed. The step S511 is to determine whether the second motor 26 is abnormally stopped. When the second motor 26 is confirmed to be not abnormally stopped, the step S501 is executed after the step S511. When the second motor 26 is confirmed to be abnormally stopped, a step S513 is executed after the step S511. In the step S513, a rotation speed of the first motor 25 is increased to compensate for the lack of rotation speed. In detail, when the second motor 26 is abnormally stopped, a voltage level of the second control command pin 221 of the second motor driver 22 and a voltage level of the first rotation information pin 212 of the first motor driver 21 are both pulled down to low voltage levels.

Figure 6:
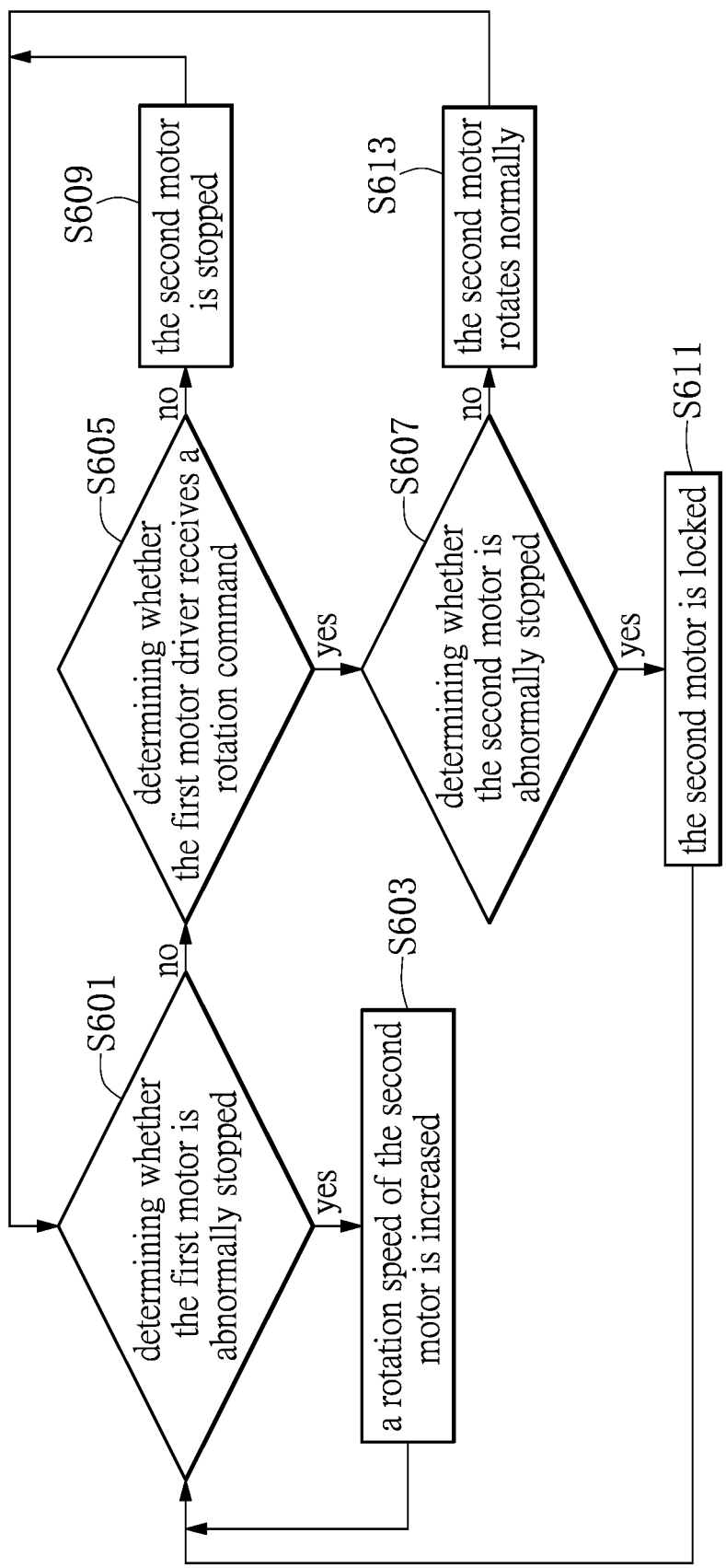
FIG. 6 is a flowchart of the control method of the motor driver in a slave mode according to one embodiment of the present disclosure.

FIG. 6 is a flowchart of a control method of the motor driver in a slave mode according to an embodiment of the present disclosure. Referring to FIG. 6, a step S601 is to determine whether the first motor 25 is abnormally stopped. When the first motor 25 is confirmed to be abnormally stopped, a step S603 is executed after the step S601. In the step S603, a rotation speed of the second motor 26 is increased, and then the step S601 is executed. In detail, when the first motor 25 is abnormally stopped, the voltage level of the first rotation information pin 212 of the first motor driver 21 and the voltage level of the second control command pin 221 of the second motor driver 22 are both pulled down to low voltage levels.

When the first motor 25 is confirmed to be not abnormally stopped, a step S605 is executed after the step S601. The step S605 is to determine whether the first motor driver 21 receives a rotation command. When the first motor driver 21 is confirmed to receive the rotation command, a step S607 is executed after the step S605. When the first motor driver 21 is confirmed to not receive the rotation command, a step S609 is executed after the step S605.

The step S607 is to determine whether the second motor 26 is abnormally stopped. In the step S609, the second motor 26 is stopped, and then the step S601 is executed. When the second motor 26 is confirmed to be abnormally stopped, a step S611 is executed after the step S607. When the second motor 26 is confirmed to be not abnormally stopped, a step S613 is executed after the step S607.

In the step S611, the second motor 26 is locked, and then the step S601 is executed. In the step S613, the second motor 26 rotates normally, and then the step S601 is executed.

Beneficial Effects of the Embodiment

In conclusion, in the motor driver, the control method of the motor driver and the motor driving system provided by the present disclosure, a user only needs to provide the reference signal to the rotation information pin of the motor driver for setting a mode of the motor driver as the master mode or the slave mode. In this way, all the motor drivers can share the same material number, thereby achieving an effect of reducing costs. In addition, a single communication transmission line is used to connect all the motor drivers, so that the motor driver in the master mode communicates with multiple motor drivers in the slave mode in real time, and the motor drivers in the slave mode also communicate with each other in real time. Furthermore, when the motor matched with any one of the motor drivers is abnormally stopped, other motor drivers are made aware of the abnormal stoppage through the communication transmission line and increase the rotation speed of their matched motors, so as to achieve the purpose of speed compensation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driver, including:
 a rotation information pin configured to receive a reference signal;

an analog detecting circuit electrically connected to the rotation information pin; and a mode switching circuit electrically connected to the analog detecting circuit;

wherein the analog detecting circuit is configured to determine whether the reference signal is an analog signal, and the motor driver is maintained in a master mode when the reference signal does not belong to the analog signal;

wherein the mode switching circuit is configured to determine whether the reference signal is a noise when the reference signal is the analog signal;

wherein the mode switching circuit switches the motor driver from the master mode to a slave mode when the reference signal does not belong to the noise;

wherein the mode switching circuit includes a potential judging circuit, and the potential judging circuit is configured to determine whether a potential of the reference signal continues to remain unchanged; wherein the reference signal does not belong to the noise when the potential of the reference signal continues to remain unchanged, and the reference signal is the noise when the potential of the reference signal does not continue to remain unchanged.

2. The motor driver according to claim 1, wherein the analog detecting circuit is an analog-to-digital converter.

3. The motor driver according to claim 1, wherein the analog detecting circuit is a comparator.

4. A control method of a motor driver, including:

receiving a reference signal by a rotation information pin;

determining, by an analog detecting circuit, whether the reference signal is an analog signal;

maintaining the motor driver in a master mode when the reference signal does not belong to the analog signal;

determining, by a mode switching circuit, whether the reference signal is a noise when the reference signal is the analog signal; and switching, by the mode switching circuit, the motor driver from the master mode to a slave mode when the reference signal does not belong to the noise;

wherein the step of determining whether the reference signal is the noise by the mode switching circuit includes: determining whether a potential of the reference signal continues to remain unchanged by a potential judging circuit, wherein the reference signal does not belong to the noise when the potential of the reference signal continues to remain unchanged, and the reference signal is the noise when the potential of the reference signal does not continue to remain unchanged.

5. A motor driving system, including:

a first motor driver including a first control command pin, a first rotation information pin, a first analog detecting circuit, and a first mode switching circuit, wherein the first control command pin is configured to receive a control command, the first rotation information pin outputs a rotation speed signal according to the control command, the first rotation information pin is electrically connected to the first analog detecting circuit, and the first mode switching circuit is electrically connected to the first analog detecting circuit; and a second motor driver including a second control command pin, a second rotation information pin, a second analog detecting circuit, and a second mode switching circuit, wherein the second control command pin is electrically connected to the first rotation information pin, the second rotation information pin is configured to receive a reference signal, the second rotation information pin is electrically connected to the second analog detecting circuit, and the second mode switching circuit is electrically connected to the second analog detecting circuit;

wherein the second analog detecting circuit is configured to determine whether the reference signal is an analog signal, and the second motor driver is maintained in a master mode when the reference signal does not belong to the analog signal;

wherein the second mode switching circuit includes a potential judging circuit, the potential judging circuit is configured to determine whether a potential of the reference signal continues to remain unchanged when the reference signal is the analog signal;

wherein, when the potential of the reference signal continues to remain unchanged, the reference signal does not belong to a noise;

wherein, when the reference signal does not belong to the noise, the second motor driver is switched from the master mode to a slave mode.

6. The motor driving system according to claim 5, further including a first motor and a second motor, wherein the first motor and the second motor are respectively and electrically connected to the first motor driver and the second motor driver; wherein the first motor is locked when the control command received by the first control command pin is a rotation command and the first motor is abnormally stopped.

7. The motor driving system according to claim 5, further including a first motor and a second motor, wherein the first motor and the second motor are respectively and electrically connected to the first motor driver and the second motor driver; wherein the first motor rotates normally when the control command received by the first control command pin is a rotation command and the first motor is not abnormally stopped.

8. The motor driving system according to claim 5, further including a first motor and a second motor, wherein the first motor and the second motor are respectively and electrically connected to the first motor driver and the second motor driver; wherein a rotation speed of the first motor is increased when the first motor rotates normally and the second motor is abnormally stopped.

9. The motor driving system according to claim 5, further including a first motor and a second motor, wherein the first motor and the second motor are respectively and electrically connected to the first motor driver and the second motor driver; wherein a rotation speed of the second motor is increased when the first motor is abnormally stopped.

10. The motor driving system according to claim 5, further including a first motor and a second motor, wherein the first motor and the second motor are respectively and electrically connected to the first motor driver and the second motor driver; wherein the second motor is locked when the control command received by the first control command pin is a rotation command and the second motor is abnormally stopped.

* * * * *